Jan. 5, 1965 B. RANKY 3,164,780

VARIABLE BAND WIDTH CONSTANT AMPLITUDE FILTER

Filed Jan. 10, 1961 2 Sheets-Sheet 1

INVENTOR.
BELA RANKY
BY Hurvitz & Rose
ATTORNEYS

Jan. 5, 1965 B. RANKY 3,164,780

VARIABLE BAND WIDTH CONSTANT AMPLITUDE FILTER

Filed Jan. 10, 1961 2 Sheets-Sheet 2

INVENTOR.
BELA RANKY
BY Hurvitz & Rose
ATTORNEYS

United States Patent Office 3,164,780

Patented Jan. 5, 1965

3,164,780
VARIABLE BAND WIDTH CONSTANT AMPLITUDE FILTER

Bela Ranky, Flushing, N.Y., assignor, by mesne assignments, to The Singer Manufacturing Company, a corporation of New Jersey Filed Jan. 10, 1961, Ser. No. 81,875
15 Claims. (Cl. 330—157)

The present invention relates generally to variable band-width filters, and more particularly to systems for maintaining the output of a band-pass filter constant during variation of its band-width characteristic.

In general, the bandwidth characteristic of a panoramic system or spectrum analyzer is required to be variable, in order to vary the resolution of the system. The gain of the system is required to remain constant at any gain setting, despite manipulation of a bandwidth or resolution control device of the system. Bandwidth of a conventional panoramic system is established by the selectivity of a band-pass filter. The bandwidth of a band-pass filter can be varied by varying its loading, but this varies the output amplitude of the filter. It is therefore usual to provide devices, in such receivers for compensating gain changes in resolution controlling filters which occur concurrently with and as a result of varying bandwidth of the filters. This may readily be accomplished, for example, by ganging a bandwidth and a gain control element of the system, but provision of ganged controls is undesirable.

It is an object and feature of the present invention to provide a completely automatic, inherent, continuous, internal self-compensation of output amplitude of a filter when its bandwidth is varied.

Briefly describing the principle of the invention, the output of a filter is divided into two parallel channels, in one of these channels is provided a bandwidth control device, which varies loading of the filter, and thus varies its bandwidth. Such a device may consist of a single variable resistance. In the other channel, which may contain no bandwidth control elements, voltage response decreases substantially and inherently as a function of filter loading. Loading current in the one channel is translated to voltage, and the voltage outputs of the two channels are combined, to provide true or usable filter output. Current flow, i.e. loading, translated to porportional voltage, is utilized as a controlled parameter in the first channel, and direct voltage response of the filter in the second. By properly proportioning the two channels, the result can be achieved that the true or usable output of the filter remains constant with variation of bandwidth, since loading current and output voltage of a filter vary inversely of one another. Essentially, use is made of the fact that increased loading, or increase of filter output current, is accompanied by a decrease of filter output voltage, and vice versa, and that the variable loading current can be converted to a compensation voltage.

It is, accordingly, a broad object of the present invention to provide a novel system of concurrent bandwidth and gain control for filters and band-pass amplifiers.

It is another object of the invention to provide a system of concurrent and inherent bandwidth control and gain compensation for filters and amplifiers.

It is a further object of the invention to provide a system of concurrent gain and bandwidth adjustment for band-pass filters and amplifiers, the latter having thereby a constant gain for a wide range of bandwidth adjustments.

It is still another object of the present invention to provide a bandwidth control, consisting of a single variable resistance, for varying the loading of a filter, and a circuit for compensating for filter gain variation due to such loading which is directly responsive to the degree of loading itself.

A further object of the invention resides in the provision of a pair of channels coupled to a filter, a response of one of the channels being inversely proportional to filter loading and a response of the remaining channel being directly proportional to filter loading, whereby the combined response of the channels is invariant to filter loading.

Another object of the invention is to combine a voltage developed from the loading or current response of a filter with the voltage response of the filter as filter loading, and hence bandwidth, is varied.

The above and still further objects, features and advantages of the present invention will become apparent upon consideration of the following detailed description of one specific embodiment thereof, especially when taken in conjunction with the accompanying drawings, wherein.

Corresponding parts in the several illustrated embodiments of the invention are identified by the same reference numerals.

Figure 1:
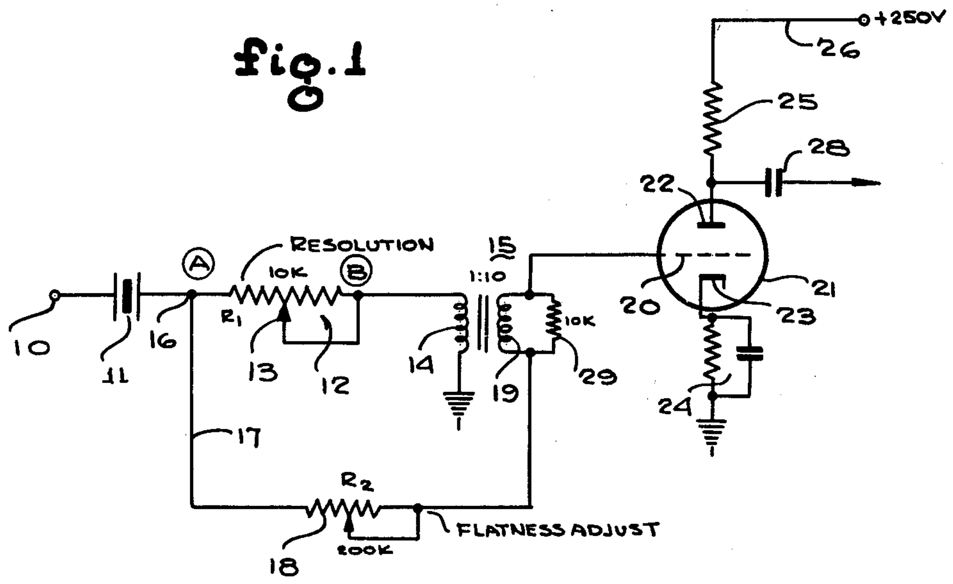
FIGURE 1 is a schematic circuit diagram of a system according to the invention.

Referring now to FIGURE 1 of the accompanying drawings, the reference numeral 10 denotes a signal input terminal, to which may be applied an A.C. signal. In an exemplary application of the present invention the terminal 10 may represent an interstage coupling of an I.F. amplifier, a heterodyne mixer output terminal, or the like. In cascade with the terminal 10 is a piezo-electric crystal filter 11, which is exemplary of a variety of crystal filters or of filters which do not employ piezo-electric crystals, but which is of such nature that its response bandwidth may be varied by varying its loading.

The filter 11 is connected in series with a variable loading resistance 12 having a slider 13, adjustable between points A and B of the resistance 12. The resistance 12 is connected in series with the primary winding 14 of a transformer 15.

When the slider 13 is at point A of resistance 12 of the crystal 11 it is heavily loaded, i.e. carries relatively heavy current, since its sole load is the primary winding 14. When the slider 13 is at point B, the loading of crystal 11 is radically reduced, since the entire resistance 12 (10K) is in series with the primary winding 14. As the slider 13 moves from A to B, intermediate values of loading exist.

A heavily loaded crystal, or filter, has a relatively narrow band response, whereas a lightly loaded crystal has a broad band response. Accordingly, as the slider 13 moves from A to B along the resistance 12 the selectivity of the crystal filter 11 varies from a low value to a high value, i.e. from narrow band to broad band condition.

From the junction 16 of crystal 11 and resistance 12 proceeds a lead 17, connected in series to a variable resistance 18 and through the secondary winding 19 of transformer 15 to the control grid 20 of a triode 21. The latter includes an anode 22 and a cathode 23, the latter being connected to ground through a conventional bias circuit 24. The anode 22 is provided with a resistance load 25 and a B+ source 26, and a signal output lead 27 is coupled, via capacitance 28, to the anode 22. A (10K) resistance 29 may be connected across secondary winding 19 to provide damping.

In operation, current passed by the crystal filter 11 proceeds via resistance 12 through primary winding 14 and induces a voltage in secondary winding 19 and hence at grid 20. This voltage is a function of current flowing through crystal filter 11, which in turn is a function of the value of resistance 12. The higher the value of resistance 12 the lower the current flowing in primary winding 14, and the lower the voltage at control grid 20, and vice versa.

In the channel comprising lead 17, on the other hand, a series circuit extends to control grid 20, and no transformer is interposed. When the value of resistance 12 is high, i.e. when the slider is at point B, the crystal filter 11 is not loaded. The voltage output thereof is then maximum and a high voltage is transferred to control grid 20. Conversely, when slider 13 is at point A, the crystal filter 11 is highly loaded, its output voltage is small and the voltage transferred to control grid 20 via lead 17 is small. Under the latter conditions current flow from crystal filter 11 to primary winding 14 is large, since a small impedance is interposed. Accordingly, voltage transfer to control grid 20 is large via the resolution control channel but is small via the parallel channel.

The fact that signal flow in the two parallel channels, i.e. the channel containing variable resistance 12 and the channel of lead 17, depends, respectively, on current and voltage output of filter 11 assures inverse voltage transfers at the outputs of the two channels, and hence true compensation over all values of variable resistance 12.

The value of resistance 18 is adjustable to vary the flatness of the response. Variable resistance 18 is therefore denominated a "flatness" adjust element, and variable resistance 12 a "resolution adjust" element.

Figure 2:
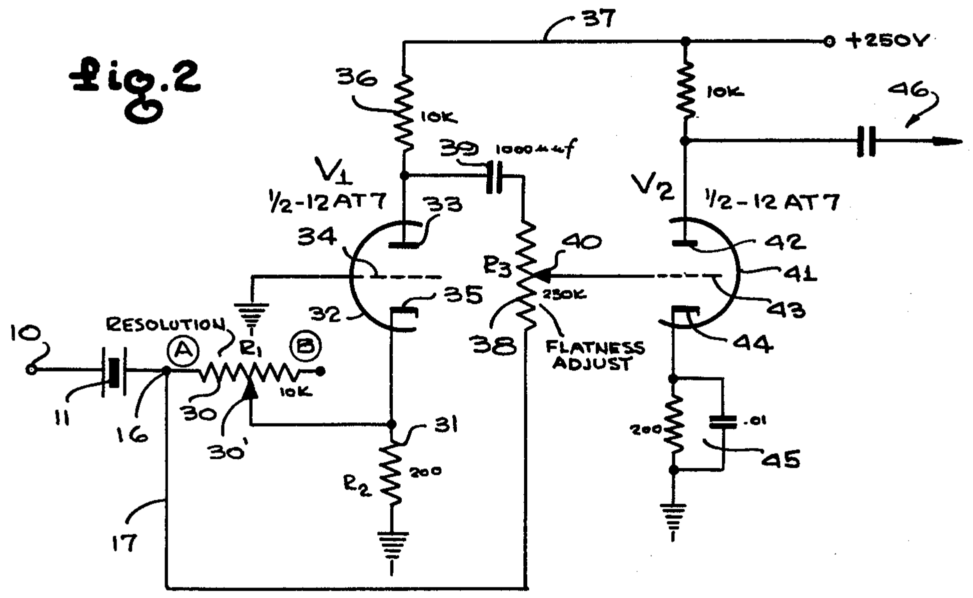
FIGURE 2 is a schematic circuit diagram of a modification of the system of FIGURE 1.

In the system of FIGURE 2 the crystal filter 11 is connected through variable resolution adjust resistance 30 and a small fixed resistance 31 to ground. The resistance 31 is an unbypassed cathode resistance of a triode half, 32, connected in the grounded grid configuration, and including an anode 33, a grounded control grid 34 and a cathode 35. The anode 33 is provided with a resistive load 36, in series with a B+ supply line 37.

Lead 17 proceeds through potentiometer resistance 38 and blocking condenser 39 to anode 33. A variable tap 40 extends to the potentiometer resistance 38.

An amplifier triode half, 41, is provided, including a resistance loaded anode 42, a control grid 43 and a cathode 44. The latter is connected to ground through a conventional bias circuit 45. The control grid 43 is directly connected to the tap 40 and a signal output 46 lead is capacitively coupled to anode 42.

In operation, the small fixed resistance 31 develops a voltage proportional to current flow through crystal filter 11, i.e. to filter loading, which is translated to a voltage at anode 33. A voltage is applied to lead 17 which is proportional to voltage at junction 16.

Variation of the value of resistance 30 serves to load the crystal filter 11 variably. When tap 30′ is at A the crystal filter is maximum loaded, since only the small resistance 31 is in series therewith. Its output voltage is then minimum and its bandwidth maximum, but it delivers maximum current to resistance 31. The latter then develops maximum positive voltage at cathode 35, and hence maximum voltage at anode 33.

Since the voltages at anode 33 and at lead 17 are applied to opposite ends of resistance 38, and taking account of phase, the latter acts as a voltage summing device in any desired proportion, the summed voltage may be taken off at tap 40. Since the voltages applied to the ends of resistance 38 vary in opposite senses as resolution adjust resistance 30 is varied, voltage at tap 40 is invariant with respect to setting of resistance 30.

As the resolution adjust control 30′ is moved toward point B, the voltage applied to the cathode 35 will decrease, resulting in a decrease in the voltage appearing at anode 33. Meanwhile, the voltage being applied to the lead 17 will increase, due to the decrease in loading of the crystal filter 11. Since the grid voltage on triode half 32 is the sum of the voltages being applied to both sides of resistance 38, it will remain constant as one increases and the other proportionally decreases. This will result in a constant amplitude output at the plate of triode half 41, for all settings of the resolution adjust control 30′.

Figure 3:
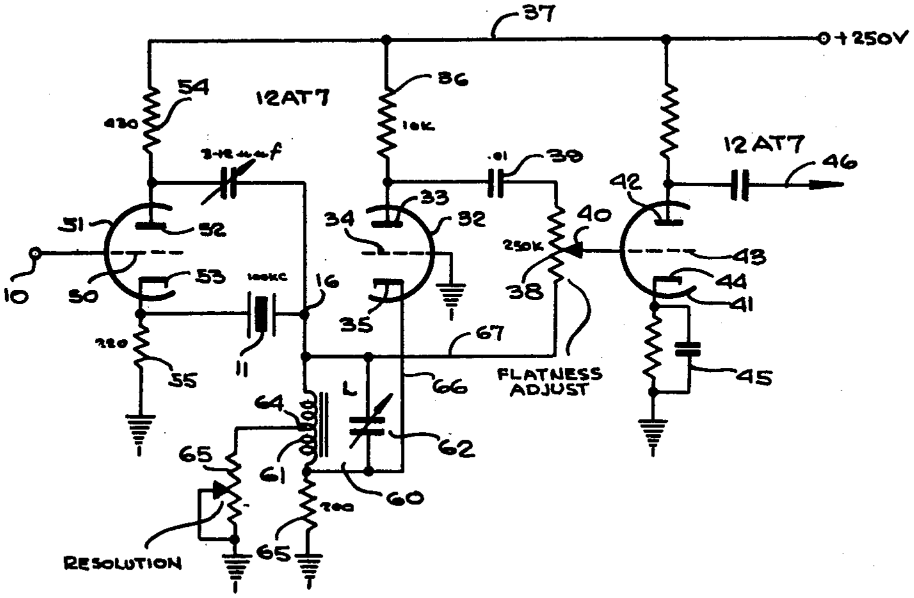
FIGURE 3 is a schematic circuit diagram of a modification of the system of FIGURE 2.

In the system of FIGURE 3, the signal input terminal 10 is applied to the control grid 50 of a triode 51, having an anode 52 and a cathode 53. Anode 52 is provided with an anode load 54, a cathode 53 with a small load resistance 55 (220Ω). The latter supplies input signal to one terminal of crystal filter 11, the output terminal of which is junction point 16. Between anode 52 and junction point 16 is connected a variable capacitor 56 (3–12 $\mu\mu$f.) which supplies input signal to terminal 16 co-phase with that supplied through crystal filter 11, and hence serves for neutralization at terminal 16.

The terminal 16 supplies signal to a parallel tuned circuit 60, comprising inductance 61 and variable tuning capacitance 62, tuned to signal frequency. The tuned circuit 60 then presents a relatively high impedance at signal frequency. This impedance can be varied by means of a shunting variable resistance 63, connected between a tap 64 on inductance 61, and a ground point. A small fixed resistance 65 is connected from the ground point to the tuned circuit 60.

The tuned circuit 60, with its variable load 63, presents a variable loading impedance for filter 11, equivalent to a load resistance in respect to phase relations. Lead 66 provides a voltage, generated across fixed resistance 65, which is proportional to current in the loading impedance. Lead 67 provides a voltage consonant with filter loading.

The signal voltage on lead 66 is additively combined with the signal voltage on lead 67 in the system of FIGURE 2, i.e. grounded grid triode half 32 is cathode driven by the voltage on lead 66, and in turn drives one end of resistance 38. The other end of resistance 38 is driven directly from lead 67, and a flatness adjust variable tap 40 provides net output signal of the system.

Figure 4:
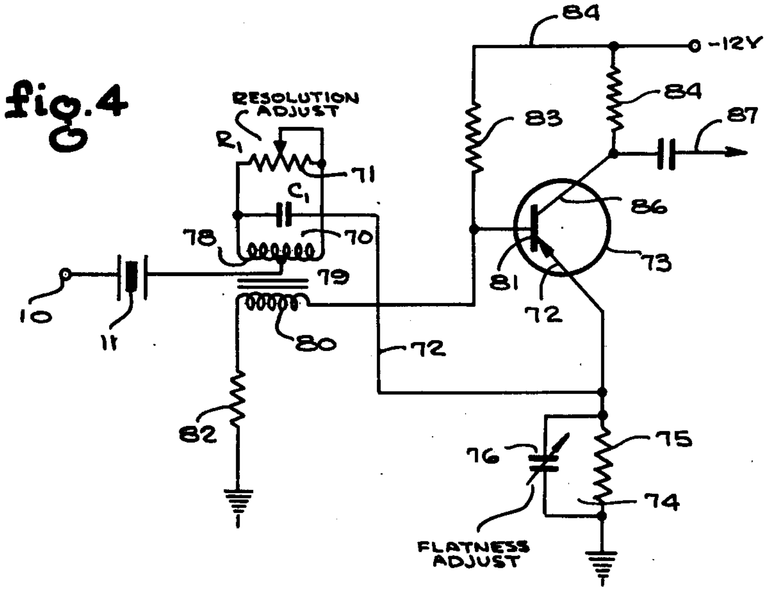
FIGURE 4 is a schematic circuit diagram of a transistorized version of the system of FIGURE 1.

In the system of FIGURE 4, A.C. input signal is supplied at terminal 10, and passes through crystal filter 11. In cascade with the crystal filter 11 is a variable loading impedance, comprising a parallel resonant circuit 70, tuned to the input frequency and provided with a variable shunt resistance 71, which controls the apparent resistance of parallel resonant circuit 70, as seen by filter 11. The output of parallel resonant circuit 70 is applied via lead 72 to the emitter electrode 73 of a transistor 77, and to a bias circuit 74 for emitter electrode 73. The latter includes a fixed resistance 75 and a variable capacitance 76, which operates as a flatness adjust.

The parallel resonant circuit 70 includes a center tapped inductance 78, which is also the primary winding of a transformer 79, having a secondary winding 80. The latter is connected to the base 81 of transistor 77, and via a fixed resistance 82 to ground.

Bias is set for base electrode 81 by means of a fixed resistance 83, connected to negative supply lead 84. Resistances 82 and 83 constitute a voltage divider, base 81 being effectively connected to their junction. A load resistance 85 for collector electrode 86 of transistor 77 is connected between the collector electrode 86 and negative supply lead 84, and net output signal is derived on lead 87, capacitively coupled to collector electrode 86.

In operation, when resistance 71 is made smaller the bandwidth response of filter 11 is narrowed. The voltage supplied to base electrode 81 is compensatory to the voltage applied to emitter electrode 72. The latter represents the A.C. voltage output of filter 11, while the voltage supplied by secondary winding 80 is representative of loading current, since it is induced by current flowing in primarry winding 78, which in turn is proportional to the current output of filter 11. The transistor 73 then operates as a summing device and collector current remains invariant to filter loading, or to setting of resolution control resistance 71.

While I have described and illustrated one specific embodiment of the present invention, it will become apparent that variations of the specific details of construction may be resorted to without departing from the true spirit and scope of the invention as defined in the appended claims.

I claim:

1. In combination, a band-pass filter having an input and an output, means for variably loading said filter to vary the band-pass characteristic of said filter, means connected to said filter output for deriving first and second responses of said filter to signals applied to said filter output, said first response being a current response of said filter, said second response being a voltage response of said filter, means for converting said current response to a voltage response proportional to said current response, and means for additively combining the first mentioned and last mentioned voltage responses.

2. In combination, a band-pass filter having input and output, means for applying signal frequencies to said filter input, an output channel coupled in cascade with said filter output for deriving a first output signal voltage from said filter, a filter loading channel coupled to said filter output, said filter loading channel including impedance means for variably loading said filter output to controllably vary the bandwidth of said filter, means responsive to signal current in said filter loading channel for developing a second output signal voltage from said filter, and means additively combining said first and second output signal voltage.

3. The combination according to claim 2 wherein said means responsive to signal current in said filter loading channel is a transformer having a low impedance primary winding coupled to said filter output through said filter loading channel.

4. The combination according to claim 2 wherein said means responsive to signal current includes a relatively low resistance, said resistance coupled to said filter output through said filter loading channel, and a vacuum tube amplifier having an impedance loaded anode and a grounded grid, said relatively low resistance being a cathode resistance for said vacuum tube amplifier, said second voltage being taken from the output of said amplifier at said anode.

5. The combination according to claim 2 wherein said means additively combining includes a transistor having a base electrode circuit, an emitter electrode circuit and a collector electrode circuit, means connecting one of said channels to said emitter electrode circuit, means connecting the other of said channels to said base electrode circuit, and a load connected in said collector electrode circuit.

6. The combination according to claim 2 wherein said means additively combining includes a resistance having two ends and an intermediate variable tap, means coupling said channels, respectively, to different ones of said two ends, said variable tap constituting an output terminal.

7. In a combination, a band-pass filter having input and output, means for applying signals to said filter input, means coupled to said band-pass filter output for deriving a first alternating voltage output from said band-pass filter in response to said applied signals, a loading circuit coupled to said band-pass filter output, said loading circuit including variable impedance means for controllably varying the bandwidth of said filter, means coupled to said loading circuit for developing a further alternating voltage output proportional in amplitude to the loading of said filter, and means combining said alternating voltages to provide a net response of said band-pass filter which is substantially invariant to the loading.

8. In a system for maintaining constant the output signal amplitude response of a band-pass filter to input signals applied thereto irrespective of variation in the band-pass characteristic of said filter, the combination of a first channel coupled to the output of said filter for deriving a current response therefrom, said first channel including means for variably loading said filter output to vary said current response, means coupled to said first channel for proportionally transforming said current response to a voltage response, a second channel coupled to said filter output and responsive to the signal voltage thereat to produce an output voltage proportional thereto, means for linearly combining said voltage response and said output voltage, and means for applying said voltage response and said output voltage to said combining means.

9. In combination, a band-pass filter, said filter having input and output terminals, a variable impedance circuit connected in cascade with said output terminals for controllably deriving current from said filter in response to signals applied at said input terminals, a high impedance circuit connected in shunt with said variable impedance circuit from said output terminals, means coupled to said variable impedance circuit for providing an output voltage proportional to said derived current, and means for combining the voltage response of said high impedance circuit with said output voltage.

10. In combination, a band-pass filter having input and output, means for introducing signals into said filter input, means for variably extracting current from said filter in response to said input signals to vary the band-pass characteristic of said filter, said current extracting means being coupled to said filter output, means for converting said extracted current to a voltage proportional thereto, said conversion means coupled to said current extracting means, circuit means shunting said filter output and responsive to the voltage thereacross for providing a further voltage proportional thereto, means for linearly combining said first-mentioned voltage and said further voltage to provide an output signal having a fixed voltage amplitude to provide an ouput signal having a fixed voltage amplitude irrespective of said variation in said filter band-pass characteristic, and means for applying said first mentioned voltage and said further voltage to said combining means.

11. In combination, filter means for providing output signals extending over a selective range of frequencies in response to input signals extending over a relatively wider range of frequencies, first circuit means coupled to the output of said filter means for deriving a first electrical signal parameter of said output signals, said first circuit means including variable impedance means for controllably varying said derived first electrical signal parameter, means coupled to said first circuit means for converting said derived first electrical signal parameter to a second electrical signal parameter directly proportional thereto, second circuit means coupled to said filter means output for deriving a second electrical signal parameter of said output signals inversely proportional to said derived first electrical signal parameter, said first and last mentioned second signal parameters being of the same parameter and having different amplitudes, and means for combining said first and last mentioned second electrical signal parameters to produce a further signal having a fixed second signal parameter amplitude irrespective of said controlled variation of said derived first electrical signal parameter.

12. In combination, a band-pass filter, first and second electrical channels, each of said channels having an input and an output, said first channel input being serially connected to the output of said filter, said second channel input being connected in shunt with the output of said filter, means for applying signal frequencies to the input of said filter, said first channel including means for variably loading said filter output to vary the current response thereof to said signals, means coupled to said first channel output for deriving a first voltage output indicative of said loading, said second channel producing a second voltage output proportional to the voltage response of said filter to said signals and further indicative of said loading, and means for algebraically combining said first and second voltage outputs.

13. In combination, filter means for providing output signals extending over a selective range of frequencies in response to input signals extending over a relatively wider range of frequencies, first circuit means connected to the output of said filter means for variably controlling the output signal current of said filter means whereby said selective output frequency range is varied, second circuit means connected to the output of said filter means for deriving an output signal voltage therefrom in accordance with said variably controlled output signal current, means coupled to said first circuit means for translating said variably controlled signal current to a compensation voltage proportional thereto, and means for linearly combining said derived signal voltage and said compensation voltage to produce a further output signal voltage having a constant amplitude irrespective of said output frequency range selected, said combining means having input means coupled to said translating means and to said second circuit means.

14. In combination, a band-pass filter having input and output means, a first circuit coupled to said output means for deriving signal current from said filter in response to signals applied at said input means, said first circuit including variable impedance means for controllably modifying the input impedance thereof whereby said derived signal current may be varied, a second circuit coupled to said filter output means for deriving signal voltage from said filter in accordance with the input impedance of said first circuit, means for converting said derived signal current to a compensation signal voltage proportional thereto, means for applying said derived signal current to said converting means, means for combining said derived signal voltage and said compensation signal voltage, and means for applying said derived signal voltage and said compensation signal voltage to said combining means.

15. The combination according to claim 2 wherein said means responsive to signal current is a parallel resonant circuit coupled to said filter output through said filter loading channel, and wherein said impedance means for variably loading is a variable impedance shunting said parallel resonant circuit and coacting therewith to controllably vary said filter band-width.

References Cited in the file of this patent

UNITED STATES PATENTS

| | | |
|---|---|---|
| 2.070.668 | Lundry | Feb. 16, 1937 |
| 2,576,329 | Bell | Nov. 27, 1951 |
| 2,660,712 | Landon | Nov. 24, 1953 |
| 2,719,190 | Raisbeck | Sept. 27, 1955 |
| 2,796,471 | Jacobsen | June 18, 1957 |
| 2,860,310 | Meng et al. | Nov. 11, 1958 |
| 2,868,898 | Phanos | Jan. 13, 1959 |